(12) United States Patent
Troost

(10) Patent No.: US 11,487,023 B2
(45) Date of Patent: Nov. 1, 2022

(54) METHOD FOR MEASURING THE VARIANCE IN A MEASUREMENT SIGNAL, METHOD FOR DATA FUSION, COMPUTER PROGRAM, MACHINE-READABLE STORAGE MEDIUM, AND DEVICE

(71) Applicant: Robert Bosch GmbH, Stuttgart (DE)

(72) Inventor: Aaron Troost, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 16/063,904

(22) PCT Filed: Dec. 12, 2016

(86) PCT No.: PCT/EP2016/080606
§ 371 (c)(1),
(2) Date: Jun. 19, 2018

(87) PCT Pub. No.: WO2017/108473
PCT Pub. Date: Jun. 29, 2017

(65) Prior Publication Data
US 2018/0372885 A1    Dec. 27, 2018

(30) Foreign Application Priority Data

Dec. 21, 2015    (DE) .................... 10 2015 226 365.7

(51) Int. Cl.
*G01S 19/47* (2010.01)
*G01C 21/16* (2006.01)

(52) U.S. Cl.
CPC .............. *G01S 19/47* (2013.01); *G01C 21/16* (2013.01); *G01C 21/165* (2013.01)

(58) Field of Classification Search
CPC ...... G01C 21/165; G01C 21/16; G01C 21/14; G01C 2017/0081; G01S 19/47;
(Continued)

(56) References Cited

U.S. PATENT DOCUMENTS 5,719,565 A * 2/1998 Tsuno ................ B60G 17/0165
340/442
5,918,951 A * 7/1999 Rudd, III ............ B60T 8/17616
188/181 T
(Continued)

FOREIGN PATENT DOCUMENTS

JP    2001-287634 A    10/2001
JP    2008-243103 A    10/2008
(Continued)

OTHER PUBLICATIONS

Smith on "Introduction to Digital Filters with Audio Applications" Chapter 8, Sep. 2007. Retrieved on [Jul. 16, 2020]. Retrieved from the Internet<https://ccrma.stanford.edu/~jos/filters/Derivation_Group_Delay_Modulation.html> (Year: 2007).*

(Continued)

*Primary Examiner* — Jyoti Mehta
*Assistant Examiner* — Carlo Waje
(74) *Attorney, Agent, or Firm* — Maginot, Moore & Beck LLP

(57) ABSTRACT

The disclosure relates to a method for measuring the variance in a measurement signal, comprising the following steps: filtering the measurement signal by means of a high-pass filter in order to obtain a filtered measurement signal; determining the variance by using the filtered measurement signal.

17 Claims, 7 Drawing Sheets

500

The measurement signal is filtered using a high-pass filter in order to obtain a filtered signal (501).

↓

The variance in the measurement signal is determined on the basis of the filtered measurement signal (502).

(58) Field of Classification Search
CPC ............ H03H 17/04; H03H 17/0257; H03H 17/0248; H03H 2017/0081; H03H 21/0029; H03H 17/0255; H03H 17/026; G06T 5/002; G06T 8/173; B60T 8/173; B06T 8/173; G06F 17/18

See application file for complete search history.

(56) References Cited

U.S. PATENT DOCUMENTS

| | | | |
|---|---|---|---|
| 6,266,602 B1 * | 7/2001 | Yamaura | B60T 8/172 303/112 |
| 6,366,854 B1 * | 4/2002 | Tsuchiya | G01S 19/04 342/357.27 |
| 6,640,623 B2 * | 11/2003 | Ono | B60T 8/172 73/146 |
| 7,027,942 B1 * | 4/2006 | Woodard | G01R 23/165 324/76.19 |
| 7,209,938 B2 | 4/2007 | Lipp | |
| 10,718,198 B2 * | 7/2020 | Sorenson | E21B 41/00 |
| 10,724,864 B2 * | 7/2020 | Wells | G01C 19/00 |
| 10,732,647 B2 * | 8/2020 | Shen | G01C 21/165 |
| 10,776,452 B2 * | 9/2020 | Vogel | G01S 13/931 |
| 2001/0029421 A1 * | 10/2001 | Watanabe | B60G 17/0165 701/80 |
| 2003/0115232 A1 | 6/2003 | Lipp | |
| 2007/0124053 A1 * | 5/2007 | Lindskog | B60T 8/173 701/72 |
| 2007/0263712 A1 * | 11/2007 | Ling | H04B 17/18 375/227 |
| 2008/0082266 A1 * | 4/2008 | Bye | H03H 17/0257 701/472 |
| 2008/0317371 A1 | 12/2008 | Zhang et al. | |
| 2010/0057360 A1 * | 3/2010 | Ohkubo | G01P 3/00 701/500 |
| 2011/0066377 A1 * | 3/2011 | Takaoka | G01P 3/50 701/500 |
| 2016/0209236 A1 * | 7/2016 | Steinhardt | G01C 21/165 |
| 2016/0209291 A1 * | 7/2016 | Pita-Gil | G01M 1/28 |
| 2017/0158213 A1 * | 6/2017 | Mathews | B61L 3/008 |
| 2018/0009429 A1 * | 1/2018 | Hall | B60T 8/885 |

FOREIGN PATENT DOCUMENTS

| | | |
|---|---|---|
| JP | 2009-181612 A | 8/2009 |
| JP | 2014-504192 A | 2/2014 |
| JP | 2015-114221 A | 6/2015 |
| WO | 2008/157072 A1 | 12/2008 |

OTHER PUBLICATIONS

Mandal et al. in "Design of optimal linear phase FIR high pass filter using craziness based particle swarm optimization technique" on Computer and Information Sciences 24, 1, pp. 83-92. Retrieved from the Internet <https://www.sciencedirect.com/science/article/pii/S1319157811000383?via%3Dihub> (Year: 2012).*

Gui, Pengfei et al., MEMS Based IMU for Tilting Measurement: Comparison of Complementary and Kalman Filter Based Data Fusion, 2015 IEEE 10th Conference on Industrial Electronics and Applications (ICIEA), pp. 2004-2009.

International Search Report corresponding to PCT Application No. PCT/EP2016/080606, dated Mar. 31, 2017 (German and English language document) (5 pages).

* cited by examiner

METHOD FOR MEASURING THE VARIANCE IN A MEASUREMENT SIGNAL, METHOD FOR DATA FUSION, COMPUTER PROGRAM, MACHINE-READABLE STORAGE MEDIUM, AND DEVICE

This application is a 35 U.S.C. § 371 National Stage Application of PCT/EP2016/080606, filed on Dec. 12, 2016, which claims the benefit of priority to Serial No. DE 10 2015 226 365.7, filed on Dec. 21, 2015 in Germany, the disclosures of which are incorporated herein by reference in their entirety.

The present disclosure relates to a method for measuring a variance in a measurement signal and to a method for data fusion. The present disclosure also relates to a computer program, a machine-readable storage medium and a corresponding device, in particular for use in satellite-based navigation.

BACKGROUND

U.S. Pat. No. 7,209,938 B2 discloses a filter technique using a Kalman filter, which uses an adaptive estimator for the measurement variance. The technique of the Kalman filter comprises a mechanism for signal filtering. The mechanism for signal filtering further comprises a Kalman filter and a variance estimator.

In the technique of data fusion, in particular in navigation using inertial sensors and GNSS (Global Navigation Satellite System), Kalman filters are often used. In addition to a model and measurement variables, these statistical filters require information about the quality of the measurement data in the form of the variance of the measurement data.

For measurement signals whose variance is not known or is variable, adaptive Kalman filters can be used, which modify the variances. To this end, the states of the Kalman filter are usually also used and the variances are estimated by complex matrix operations.

SUMMARY

Against this background, with the present disclosure a method for estimating the noise parameters is proposed, in particular the variance.

The method is particularly suited for the measurement signals of a Kalman filter for data fusion during the delay time, in order to achieve a better and adaptive filter performance of the overall system.

It allows a resource-saving implementation, which is independent of the model that underlies the Kalman filter.

Thus, the disclosure has more the character of a measurement than the character of an estimate.

The core of the disclosure is the determination of the noise, in particular of the variance, in the measurement signals of the Kalman filter exclusively on the basis of the measurement signals themselves. Thus the determination of the noise should be considered more like a measurement of the noise. This is advantageous compared to the conventional systems, in which the noise is estimated and dependent on the stored model.

With regard to the present disclosure, it should be emphasized that the measurement of the variance takes place outside of the Kalman filter and therefore does not depend on the inherent inertia within the Kalman filter. As a result, a rapid adaptation to changes in the measurement signal is possible. Also advantageous is the fact that constant input signals more quickly give rise to a constant output signal. It is proposed to determine the variance of a measurement signal by the DC component, and therefore the real signal, being suppressed using a high-pass filter, in particular a digital high pass filter.

The advantages of the disclosure are particularly noticeable when the method is used in vehicles, e.g. for position determination based on satellite-assisted navigation systems.

The disclosure is also associated with lower hardware resource costs.

The method comprises the steps:

filtering of the measurement signal using a high pass filter, in order to obtain a filtered measurement signal;

determination of the variance on the basis of the filtered measurement signal.

The measurement signal in the present case can be any type of measurement signal. However, the disclosure originates from the finding that particularly good results in terms of the data fusion of signals of a satellite-based navigation device (GNSS signals) can be achieved with signals of an inertial sensor, for example, an acceleration sensor.

According to an advantageous embodiment the high-pass filter is a linear phase filter.

Due to the use of a linear phase filter, all noise components have the same group delay time.

Very simply, this can be achieved by the use of a finite impulse response (FIR) filter.

It has been shown that when a FIR filter is used the results of the variance measurement are significantly improved if the coefficients of the high-pass filter are dependent on the sampling rate with which the measurement signal is acquired.

Crucial to this method is to keep the group delay in the filter path as low as possible, because the noise of the measurement signals can be different depending on the driving situation.

Therefore, in a preferred embodiment of the method, the group delay of the high-pass filter is adapted to the delay in the variance relevant to the measurement task.

A small group delay prevents a change in the noise from also being rapidly carried over into a new variance, and therefore in the event of rapid changes between driving conditions the calculation of the variance is nevertheless correct.

In the specific application, i.e., the data fusion of GNSS signals with signals of an inertial sensor, for example, an acceleration sensor, a group delay of between 50 ms and 100 ms has proven advantageous. The recommended value for the group delay is 80 ms.

According to an efficient implementation of the present method, after the filtering step a second filtering step is carried out, wherein in the second filtering step the variance determined from the previously filtered measurement signal is filtered using a low-pass filter.

According to a simple embodiment, using a low-pass filter, in particular a PT1 low-pass filter, the mean value of the sum of squares can be formed continuously. This simplification is based on the recognition that the mean value of the sum of squares corresponds directly to the variance, if the mean value through the previous high pass filter is assumed to be 0.

The cutoff frequencies of the filter used are chosen according to the frequency at which the signal still contains information relevant to the measurement task.

Therefore, in accordance with one embodiment of the method the cutoff frequencies of the high-pass filter or low-pass filter are based on the frequency at which the signal still contains information relevant to the measurement task.

In the area of driving dynamics of road vehicles, depending on the number of vehicle tracks this is approximately 3 Hz to 20 Hz, in particular 5 Hz to 20 Hz.

According to one advantageous embodiment of the method, in the determination step, the variance is calculated using a running calculation, and/or using a running mean and/or using a running mean of the sum of squares.

This represents a simple implementation for calculating or measuring the variance from the high-pass filtered input signal.

In order not to obtain the entire history of the measurement signal during the continuous calculation using the running mean and the running mean of the sum of squares, but to consider only the most recent period of time instead, in accordance with an extended alternative design in the determination step a third filtering step is carried out and in this step, the running average is filtered.

Thus in a simple way, the variance calculation or measurement can be restricted to the relevant measurement period being searched.

A further aspect of the present disclosure is a method for data fusion using a Kalman filter, wherein a first input signal is a measurement signal and a second input signal is a variance of the measurement signal, and wherein the variance is measured using an embodiment of the method according to the present disclosure.

Of particular advantage here is an embodiment of the method for data fusion, according to which the variance is measured outside of the Kalman filter.

A further aspect of the present disclosure is a computer program, which is designed to carry out all steps of the method for measuring a variance and/or the method for data fusion, and a machine-readable storage medium on which an embodiment of this computer program is stored.

In addition, one aspect of the present disclosure is a device which is designed to carry out all steps of the method for measuring a variance and/or the method for data fusion.

For the implementation of such a device as an embedded system, as used for example in vehicle sensors and vehicle control units, it is particularly advisable to use divisors in the form of powers of two, in order to replace the division operation by an arithmetic shift operation.

BRIEF DESCRIPTION OF THE DRAWINGS

In the following, embodiments of the present disclosure are presented and explained based on the drawings. Shown are.

DETAILED DESCRIPTION

Figure 1:
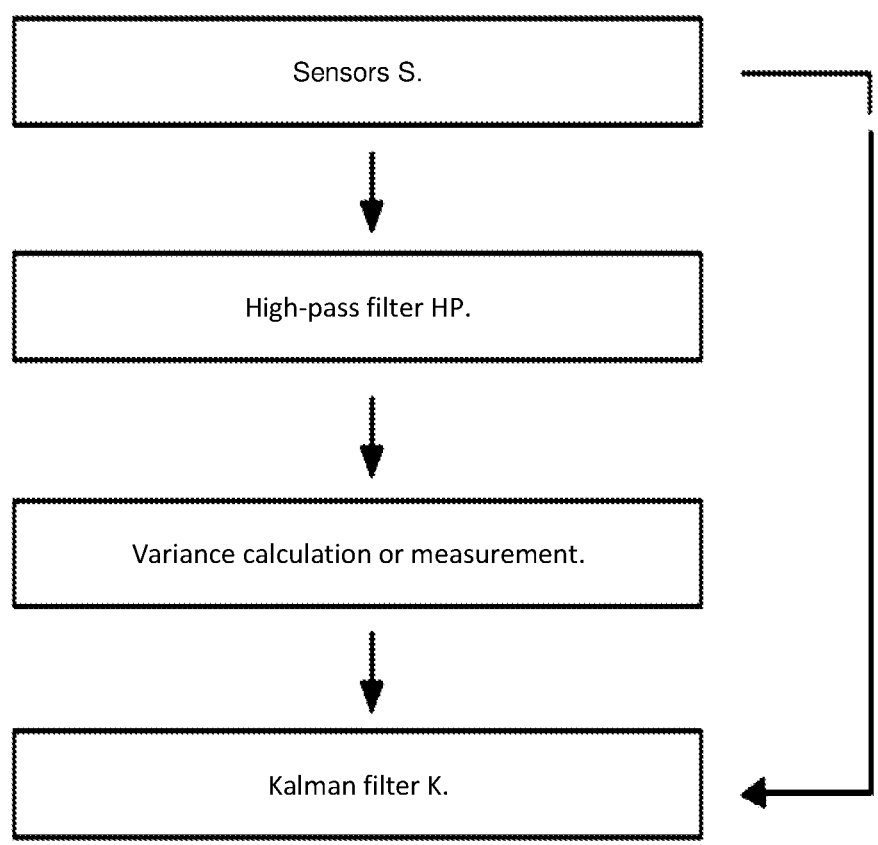
FIG. 1 a block circuit diagram of an embodiment of the present disclosure.

FIG. 1 shows a block circuit diagram of an embodiment of the present invention. The block diagram clearly shows the core of the present invention. Sensors S deliver sensor signals or measurement signals to a post-processing unit. For the data fusion of sensor signals it is advantageous to use a Kalman filter K, which is applied to the measurement signals. For this purpose, the measurement signals are fed on the one hand to the Kalman-filter K, and the measurement signals are also fed to a filter, here a high-pass filter HP, to suppress the DC component, hence the real signal. This filtered measurement signal is then fed to the variance calculation or measurement. The measured variance is in turn fed to the Kalman filter K and then evaluated as a further input variable to the data fusion.

Figure 2:
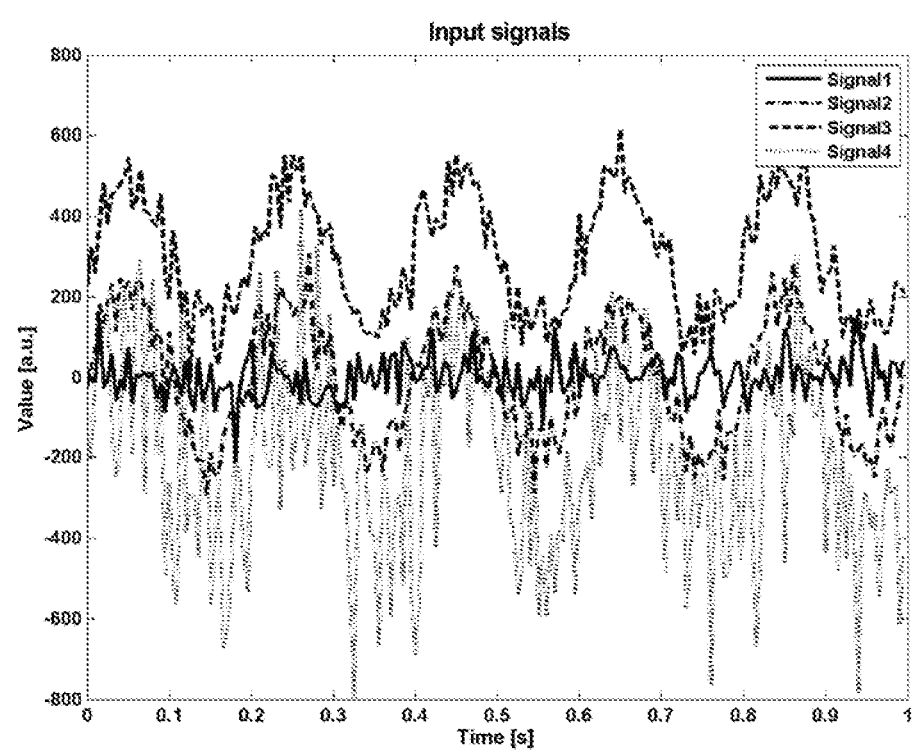
FIG. 2 a graph with input signals 1 to 4.
Figure 3A:
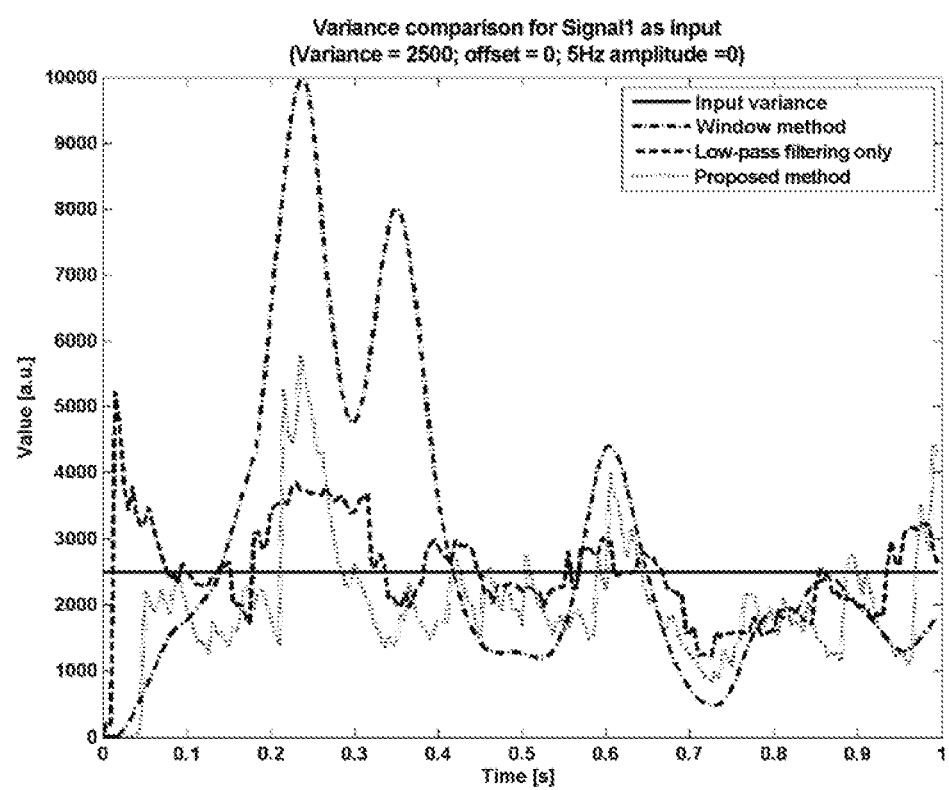
FIG. 3a a graph with variance calculations based on input signal 1 with different methods.
Figure 3B:
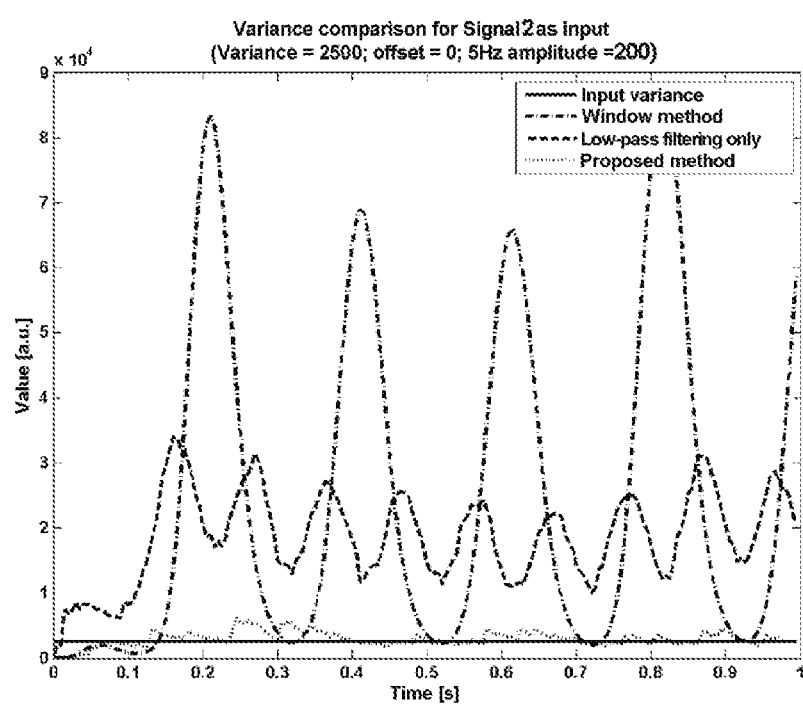
FIG. 3b a graph with variance calculations based on input signal 2 with different methods.
Figure 3C:
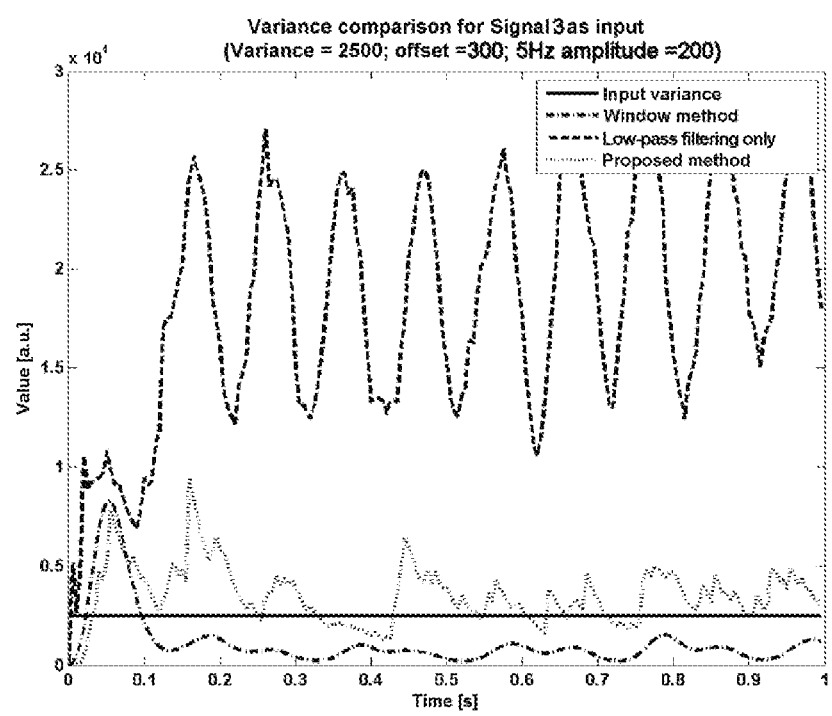
FIG. 3c a graph with variance calculations based on input signal 3 with different methods.
Figure 3D:
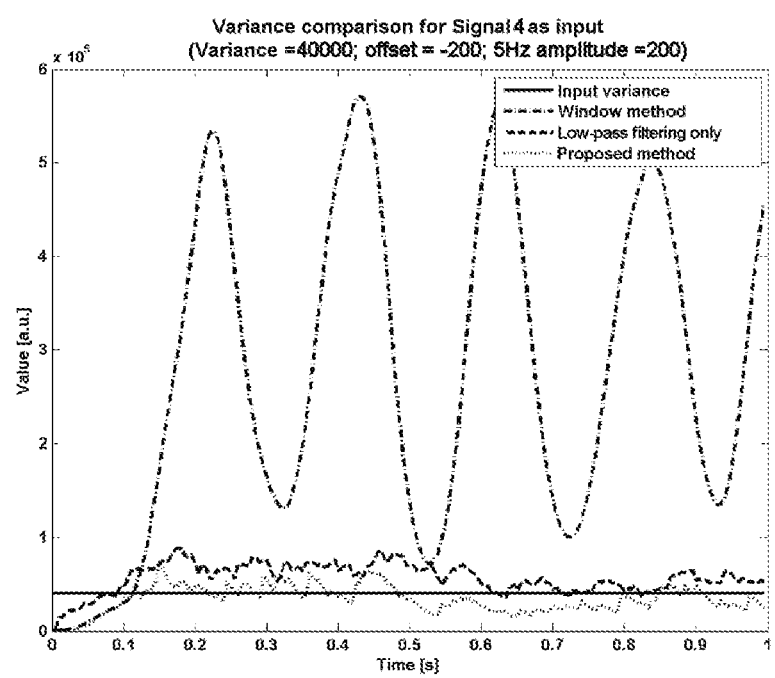
FIG. 3d a graph with variance calculations based on input signal 4 with different methods.

FIG. 2 shows a graph with four measurement signals (signal 1 to 4). As can be seen from the graph, the measurement signals differ in their amounts of variance. In the following figures, in other graphs the results of various methods for determining the variance are shown in comparison to an embodiment of the method of the present disclosure.

FIGS. 3a to 3d show graphs with results of the variance calculation in accordance with the window method and a pure low-pass filtering, in comparison to an embodiment of the method 500 of the present disclosure.

The results clearly show the power of the disclosure described, since the results of the embodiment of the method of the present disclosure vary in a much narrower range about the reference variable, which is designated as the input variance.

It is therefore clear that the present disclosure is applicable to a very wide range of input signals and delivers good results.

Figure 4:
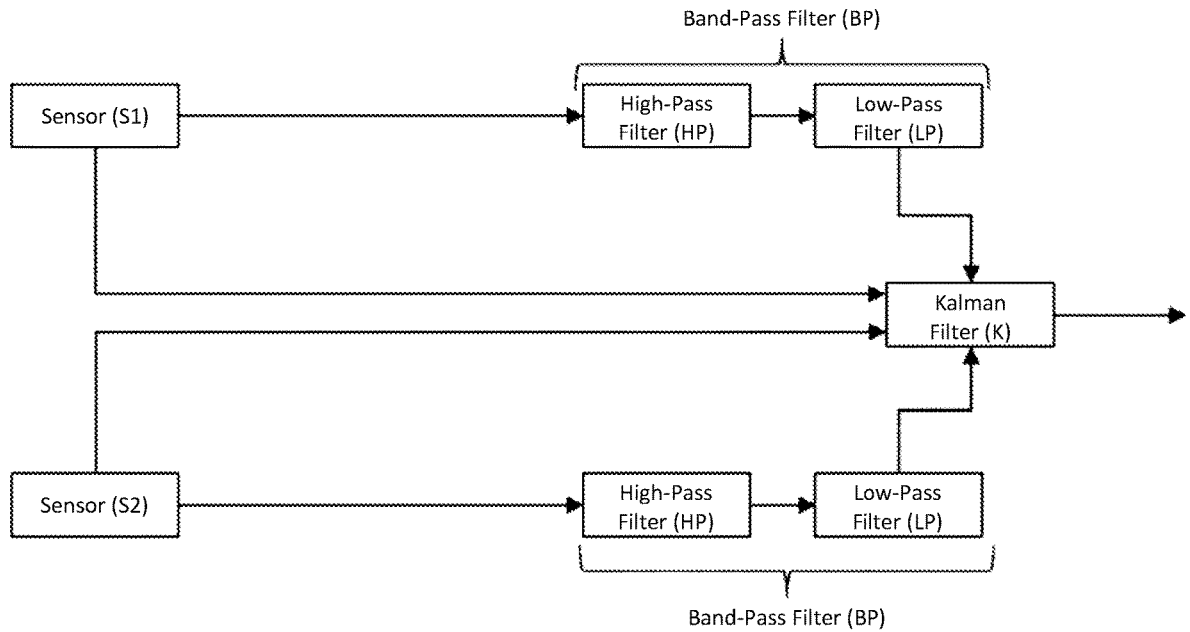
FIG. 4 a block circuit diagram.

FIG. 4 shows a block circuit diagram of an embodiment of a system having a device according to the present disclosure.

FIG. 4 shows two sensors S1 and S2, the sensor signals of which, and hence their measurement signal, are fused by means of a Kalman filter K.

To achieve this, the sensors S1, S2 input their measurement signal, on the one hand, directly into the Kalman-filter K as an input signal. In addition, the measurement signals are filtered in accordance with the method 500 of the present invention by means of a high-pass filter HP. The measurement signal filtered in this way is then filtered using a low-pass filter LP. The result of this filter step is input as a (measured) variance of the respective measurement signal into the Kalman filter K as an additional input variable.

The combination of high-pass and low-pass filter is also referred to as a band-pass filter BP. Thus, as an alternative to two individual filters a band-pass filter BP can also be used.

It goes without saying that the filters HP, LP, BP can be designed in different ways. The filters can be implemented in hardware or software, or as a combination thereof.

The resulting output of the Kalman filter K is the fused result of the two measurements or sensor signals.

In the field of driving dynamics of road vehicles the relevant information can be found in the signal between 3 Hz to 20 Hz, in particular from 5 Hz to 20 Hz.

These boundary conditions can be used to derive the result for the high-pass filter HP that the cutoff frequency of the low-pass filter LP, from which the high-pass filter HP can be generated (e.g. by inversion), should lie between approximately 5 Hz and 10 Hz, because due to the minimum possible group delay the damping will not be very high, even up to 20 Hz. The low-pass filter LP should have a cutoff frequency of at least 2 Hz, also in order not to contribute an excessively high value to the group delay.

For use in motor vehicles, a 16th order FIR high-pass filter with the coefficients $b_{HP}$=[1, 16, 36, 55, 73, 84, 93, 102, −920, 102, 93, 84, 73, 55, 36, 16, 1] and $a_{HP}$=1024 and an infinite impulse response (IIR) low-pass filter with the coefficients $b_{LP}$=[1] and $a_{LP}$=[16, −15] are proposed for a sampling rate of 200 Hz. This achieves a group delay in the passband of approximately 8 to 15 samples. At a sampling rate of 200 Hz this corresponds to a group delay of 40 ms to 75 ms.

Figure 5:
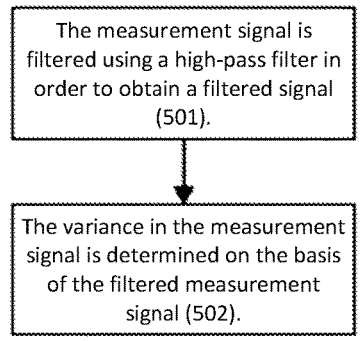
FIG. 5 a flow diagram of an embodiment of the method for measuring the variance in a measurement signal according to the present disclosure.

FIG. 5 shows a flow diagram of an embodiment of a method for measuring the variance in a measurement signal according to the present disclosure.

In step 501, the measurement signal is filtered using a high-pass filter in order to obtain a filtered signal.

In step 502, on the basis of the filtered measurement signal the variance in the measurement signal is determined.

Figure 6:
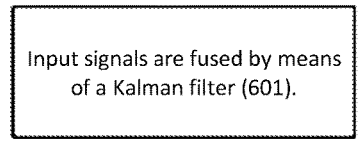
FIG. 6 a flow diagram of an embodiment of a method for data fusion according to the present disclosure.

FIG. 6 shows a flow diagram of an embodiment of a method for data fusion in accordance with the present disclosure.

In step 601, input signals are fused by means of a Kalman filter, wherein for the determination of the variance of the input signals a method for measuring the variance in a measurement signal according to the present disclosure is applied.

The invention claimed is:

1. A method for measuring a variance of a measurement signal, the method comprising:
   receiving the measurement signal from a sensor;
   filtering the measurement signal to obtain a filtered measurement signal by filtering the measurement signal first with a high pass filter and subsequently with a low pass filter; and
   determining the variance of the measurement signal by filtering a running mean value of the filtered measurement signal.

2. The method as claimed in claim 1, wherein the high pass filter is a linear phase filter.

3. The method as claimed in claim 2, wherein coefficients of the high pass filter are dependent on a sampling rate with which the measurement signal is detected.

4. The method as claimed in claim 2, further comprising:
   adapting a group delay of the high pass filter to a delay in the variance relevant to a measurement task.

5. The method as claimed in claim 1, further comprising:
   providing the variance of the measurement signal to a Kalman filter configured to fuse the measurement signal with a further input signal.

6. The method as claimed in claim 1, wherein cutoff frequencies of at least one of the high pass filter and the low pass filter are based on a frequency at which information relevant to a measurement task is still present in the measurement signal.

7. The method as claimed in claim 1, the determining of the variance further comprising:
   calculating the variance using at least one of a running calculation, a running mean, and a running mean of a sum of squares.

8. The method of claim 1, wherein the method is executed by a non-transitory computer program.

9. The method of claim 8, wherein the non-transitory computer program is stored on a computer-readable storage medium.

10. The method as claimed in claim 2, wherein the high pass filter is a Finite Impulse Response filter.

11. The method as claimed in claim 4, the adapting further comprising:
    adapting the group delay to be between 50 ms and 100 ms.

12. The method as claimed in claim 11, the adapting further comprising:
    adapting the group delay to be 80 ms.

13. The method as claimed in claim 6, wherein the cutoff frequencies are located between 2 Hz and 20 Hz.

14. The method as claimed in claim 13, wherein the cutoff frequencies are located at 5 Hz and 10 Hz.

15. A method for data fusion using a Kalman filter, the method comprising:
    receiving, with the Kalman filter, a measurement signal from a sensor as a first input signal and a variance of the measurement signal as a second input signal, wherein the variance of the measurement signal is measured by (i) filtering the measurement signal to obtain a filtered measurement signal by filtering the measurement signal first with a high pass filter and subsequently with a low pass filter, and (ii) determining the variance of the measurement signal by filtering a running mean value of the filtered measurement signal; and
    fusing the measurement signal with at least one third input signal using the Kalman filter.

16. The method as claimed in claim 15, wherein the variance of the measurement signal is measured outside of the Kalman filter.

17. A device for measuring a variance of a measurement signal, the device comprising:
    an input configured to receive the measurement signal from a sensor; and
    a filter having a high pass filter and a low pass filter, wherein the filter is configured to (i) obtain a filtered measurement signal by filtering the measurement signal first with the high pass filter and subsequently with the low pass filter and (ii) determine the variance by filtering a running mean value of the filtered measurement signal.

* * * * *